United States Patent [19]
Elwalid et al.

[11] Patent Number: 5,838,663
[45] Date of Patent: Nov. 17, 1998

[54] METHOD FOR ADMISSION CONTROL AND ROUTING BY ALLOCATING NETWORK RESOURCES IN NETWORK NODES

[75] Inventors: Anwar Elwalid, Murray Hill; Debasis Mitra, Summit; Robert H. Wentworth, Matawan, all of N.J.

[73] Assignee: Lucent Technologies Inc., Murray Hill, N.J.

[21] Appl. No.: 845,651

[22] Filed: Apr. 25, 1997

Related U.S. Application Data

[63] Continuation of Ser. No. 506,160, Jul. 24, 1995, abandoned.

[51] Int. Cl.$^6$ .................................................. H04L 12/56
[52] U.S. Cl. ........................... 370/233; 370/234; 370/253
[58] Field of Search .................................... 370/229, 230, 370/232, 234, 235, 253, 395, 351, 400, 465, 468, 233

[56] References Cited

U.S. PATENT DOCUMENTS

| | | | |
|---|---|---|---|
| 5,132,966 | 7/1992 | Hayano et al. | 370/85.6 |
| 5,179,556 | 1/1993 | Turner | 370/94.1 |
| 5,233,604 | 8/1993 | Ahmadi et al. | 370/60 |
| 5,289,462 | 2/1994 | Ahmadi et al. | 370/60.1 |
| 5,311,513 | 5/1994 | Ahmadi et al. | 370/94.1 |
| 5,357,507 | 10/1994 | Hughes et al. | 370/60 |
| 5,359,593 | 10/1994 | Derby et al. | 370/17 |
| 5,426,635 | 6/1995 | Mitra et al. | 370/60 |

OTHER PUBLICATIONS

J.W. Roberts, "Variable–Bit–Rate Traffic–Control in B–ISDN", *IEEE Comm. Mag.*, Sep. 1991, pp. 50–56.
A.I. Elwalid and D. Mitra, "Effective Bandwidth of General Markovian Traffic Sources and Admission Control of High Speed Networks", *IEEE/ACM Trans. on Networking*, vol. 1, No. 3, 1993, pp. 329–343.
R. Guerin et al., "Equivalent Capacity and Its Application to Bandwidth Allocation In High–Speed Networks", *IEEE J. Sel. Areas in Comm.*, vol. 9, No. 7, Sep. 1991, pp. 968–981.
S. E. Minzer, "Broadband ISDN and Asynchronous Transfer Mode", *IEEE Comm. Mag.*, Sep. 1989, pp. 17–24.
J. Y. Hui, "Resource Allocation for Broadband Networks," *IEEE J. Sel. Areas in Comm.*, vol. 6, No. 9, Dec. 1988.

*Primary Examiner*—Chau Nguyen
*Attorney, Agent, or Firm*—Katharyn E. Olson; Robert E. Rudnick

[57] ABSTRACT

A method regulates the admission control of, and requests for routing of, virtual circuits in a network by determining network resource requirements for the virtual circuits. In particular, the network resource requirements are based on a set of parameters used to control the flow of information from a communications device onto the virtual circuit. The requirements for network resources typically include buffer space requirements in network nodes and bandwidth requirements in network links, and the parameter used to control the flow of information are those associated with an access regulator. The network resource determination is made for the case where lossless performance in the network is required and in the case where statistical multiplexing with limited loss is allowed. Both constant bit rate and variable bit rate information is considered.

30 Claims, 5 Drawing Sheets

METHOD FOR ADMISSION CONTROL AND ROUTING BY ALLOCATING NETWORK RESOURCES IN NETWORK NODES

This application is a continuation of application Ser. No. 08/506160, filed on Jul. 24, 1995, abandoned.

TECHNICAL FIELD

The invention relates to the admission control of requests for, and routing of, virtual circuits by allocating network resources.

BACKGROUND OF THE INVENTION

Networks are a principal means of exchanging or transferring information (e.g, data, voice, text, video, etc.) among communication devices (i.e. devices for inputting and/or outputting information such as computer terminals, multimedia workstations, fax machines, printers, servers, telephones, videophones, etc.) connected to the networks.

A network typically comprises switching nodes connected to each other, and to communication devices, by links. Each link is characterized by a bandwidth or link capacity. Information input from the communication devices to the network may be of any form but is often formatted into fixed-length packets or cells. When information is to be exchanged between two communication devices, a path (comprising a set of nodes and links connecting the two communication devices) is established. This path is a so-called "virtual circuit" (VC) by which it is meant that one of the communication devices simply specifies the destination for the information, and the network delivers the information as though a dedicated circuit connected the two communication devices. Cells in transit between communication devices may temporarily be stored in buffers at nodes along the path of the virtual circuit pending sufficient available bandwidth on subsequent links along the path.

An important consideration in network operation is admission control and routing of virtual circuits. Admission control and routing is the process of deciding whether or not to admit requests for establishing new virtual circuits in the network and of selecting a path through the network for the requested virtual circuit. In particular, the task is to determine which VC requests the network can admit and route. The admission and routing determination may take into account various factors such as the network topology and current available network resources, such as buffer space in the nodes and capacity in the links, and any quality-of-service commitments (e.g. guaranteed bandwidth or maximum cell loss probability) made to users of the network.

The admission control and routing problems are typically addressed together. For example, when a network receives a request to establish a VC between communication devices, the network may initially select, based on a first criterion, a set of potential paths on which the requested VC may be routed. One such first criterion is to select, as the set of potential paths, all possible paths between the communication devices passing through less than a specified number of nodes. The network will then route the VC request on a path in the set of potential paths according to a second criterion (e.g. the VC will be routed on the path whose most heavily utilized link operates at the smallest percentage of its capacity). If no paths are in the set of potential paths or if no paths meet the second criterion, then the requested VC is not admitted.

The admission control/routing problem is complicated when a variable bit-rate (VBR) source or communications device seeks access to the network and requests a VC. The complication arises because the statistics which describe the variations in the information input from the VBR source to the network are often imprecise and thus it is difficult to predict what the requirements for network resources (such as requirements for buffer space in network nodes and requirements for bandwidth or capacity in network links) by the VBR source will be. For example, the bandwidth requirements of VBR sources typically vary with time, and the bandwidth variations typically are difficult to characterize. Thus, the admission/routing determination is made with information that may not accurately reflect the demands that the VBR source may place on the network thereby causing degraded network performance. More particularly, if the network resource requirements for a VBR source requesting a VC through the network are overestimated based on inaccurate characterizations of the VBR source, then the network will not run at full capacity in that a portion of the resources provided or allocated to the VBR source based on the the estimate will frequently not be used. Alternatively, if network resources are underestimated, the VBR source will input more information to the network than the network had provided for, and thus the network may become congested and cells traversing the network may be lost. See, e.g., James W. Roberts, "Variable-Bit-Rate Traffic-Control in B-ISDN," *IEEE Comm. Mag.*, pp. 50–56, Sept. 1991; Anwar I. Elwalid and Debasis Mitra, "Effective Bandwidth of General Markovian Traffic Sources and Admission Control of High Speed Networks," *IEEE/ACM Trans. on Networking*, Vol. 1, No. 3, pp. 329–343, 1993. Roch Guerin et al., "Equivalent Capacity and its Application to Bandwidth Allocation in High-Speed Networks," *IEEE J. Sel. Areas in Comm.*, Vol. 9, No. 7, pp. 968–981, Sept. 1991.

Thus there is a need for improved methods for determining the network resources required by requests for virtual circuits and for using the resource requirements in the process of admitting and routing the VC requests.

SUMMARY OF THE INVENTION

In accordance with the invention, requirements for network resources are allocated to a request for admission and routing of a virtual circuit from a communications device through a network, the network comprising nodes and links, where the requirements are determined based on a set of parameters used to control the flow or rate of information from the communications device into the network and onto the virtual circuit. The requirements for network resources advantageously include buffer space requirements in network nodes and bandwidth requirements in network links. The set of parameters advantageously characterize a function for controlling the flow of information from the device into the network such as the type of function performed by an access regulator. The determined network resource requirements may then be used in deciding whether to admit and how to route the requested virtual circuit in the network.

DETAILED DESCRIPTION

The following detailed description of the inventive method is divided into five sections. Section I provides an overview of the environment in which the inventive method may be practiced. Section II discusses the inventive method in a lossless multiplexing situation. Section III demonstrates how to classify sources as either statistically multiplexable or nonstatistically multiplexable. The section also describes how the inventive method can be used to allocate bandwidth and buffer for statistically multiplexable sources for a given cell loss probability. Section IV considers resource allocation for mixtures of statistically multiplexable, non-statistically multiplexable and constant bit rate sources. Section V provides a summary and conclusion.

I. Overview

Figure 1:
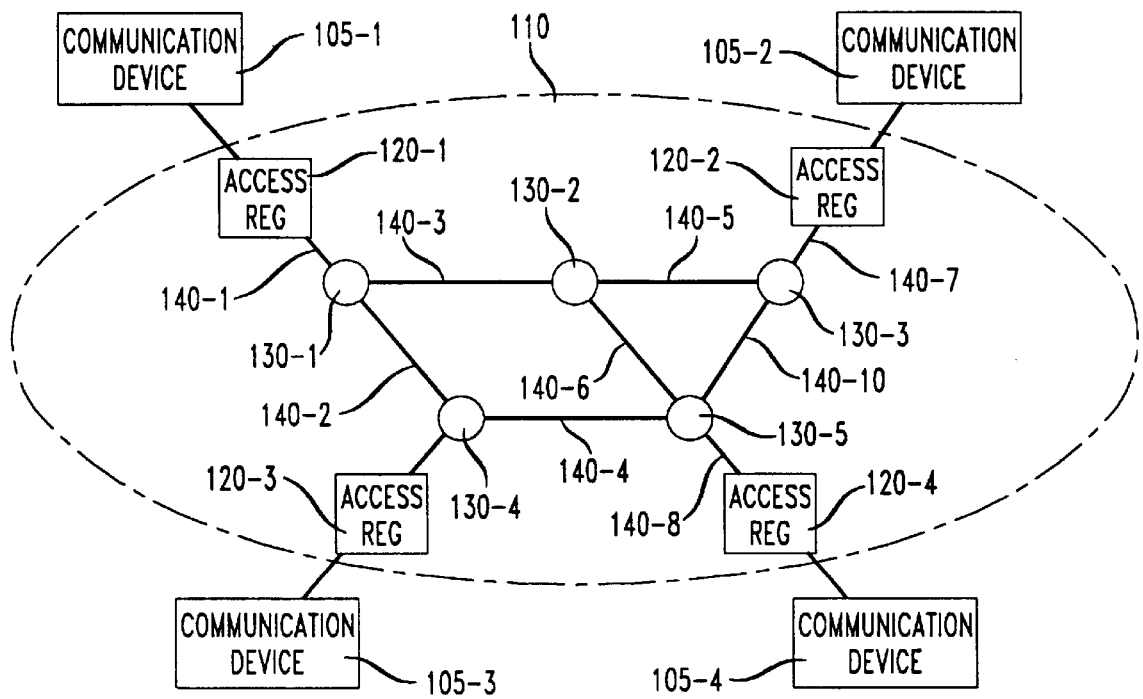
FIG. 1 illustrates a data network in which the inventive method may be practiced.

FIG. 1 illustrates a network in which the inventive method for admission control and routing of requests for virtual circuits (VCs) based on network resources required by the request may be practiced. Network 110 comprises switching nodes 130-i and links 140-k. Each communication device 105-j has associated with it devices, such as access regulators 120-j, which regulate the flow or rate of information from communication device 105-j into network 110 according to a function characterized by a set of (access regulator) parameters. For illustrative purposes, access regulator 120-j will be considered to be a leaky bucket regulator (LBR). However, other types of regulators, e.g. buffered leaky bucket regulators or cascaded leaky bucket regulators, may be used. Each communication device 105-j generates information for use by, or receives information from, other communication devices in the network. By information it is meant data, text, voice, video, etc. Information from communication device 105-j is characterized by a set of information parameters such as long term average transmission rate, peak rate and maximum burst size. The value of each information parameter in the set of information parameters is advantageously determined, for example, by contracting with the network for a maximum cell loss rate and for appropriate access regulator parameters (i.e. the rate at which information flows into the network from a device depends on the parameters of the access regulator which access regulator is advantageously a part of the network). For illustrative purposes, communication device 105-j includes such apparatus (e.g. analog-to-digital converters) so as to render the information suitable for transmission on network 110.

Figure 2:
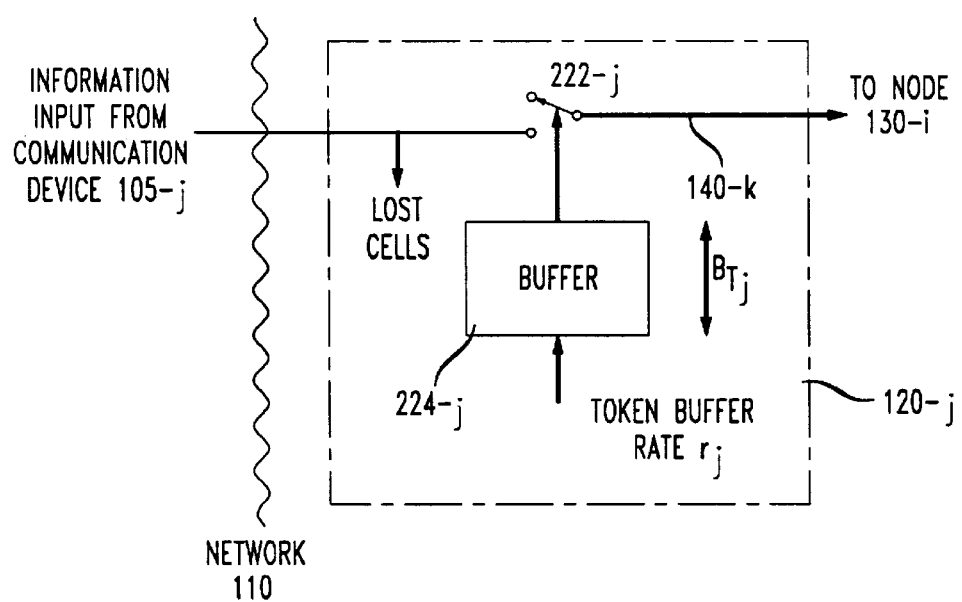
FIG. 2 illustrates the components of a leaky bucket regulator.

The operation of LBR 120-j is conceptually shown in FIG. 2. LBR 120-j comprises switch 222-j and buffer 224-j. LBR 120-j accepts information from communication device 105-j. The information from communication device 105-j is illustratively formatted into packets or cells, and information is input to LBR 120-j. Switch 222-j is closed and data is output from LBR 120-j only when a token is available in buffer 224-j. Buffer 224-j is capable of holding $B_{T_j}$ tokens. Tokens are supplied to the buffer at rate $r_j$. Information is output from LBR 120-j at a peak rate $P_j$. Thus, LBR 120-j is characterized by three parameters: the token rate $r_j$, which bounds the long term average rate of the information output from LBR 120-j; the token buffer size $B_{T_j}$, which bounds the burst size; and a peak rate parameter $P_j$, which bounds the rate at which information may leave LBR 120-j.

In the illustrative LBR 120-j of FIG. 2, if communication device 105-j inputs cells to LBR 120-j at a rate so great that the buffer underflows (i.e. so that the number of tokens in the buffer goes to zero), switch 222-j will open and cells will be lost. However, the LBR may be of the type in which, when no tokens are available, cells are "marked" as low priority cells; the marked cells are then routed through the network on a VC but are more likely to be dropped if congestion is encountered at nodes along the VC.

Returning to FIG. 1 when, for example, communication device 105-1 wishes to transmit information to communication device 105-2 via network 110, a virtual circuit (VC) is requested. A VC is a path comprising a set of nodes and set links between the LBRs associated with communication devices 105-1 and 105-2. For example in FIG. 2, one path for a VC between communication device 105-1 and 105-2 may comprise nodes 130-1, 130-2, 103-3 and links 140-1, 140-3,140-5 and 140-7. Recall that each node 130-i has associated with it at least one buffer of size $B_i$, and each link 140-k has associated with it a bandwidth capacity $C_k$. Routing the requested VC on a path will require network resources, e.g. buffer space in the nodes along the path and bandwidth in the links along the path in transmitting information between devices 105-1 and 105-2. Moreover, before the requested VC can be routed, the network resources that are required must be determined so that a path can be selected which selected path has sufficient resources to accommodate the VC. In other words, if communications device 105-1 has a certain buffer requirement in the nodes and a certain bandwidth requirement in the links, the requested VC should be routed only on those paths comprising nodes and links with sufficient resources to meet the certain requirements.

Figure 3:
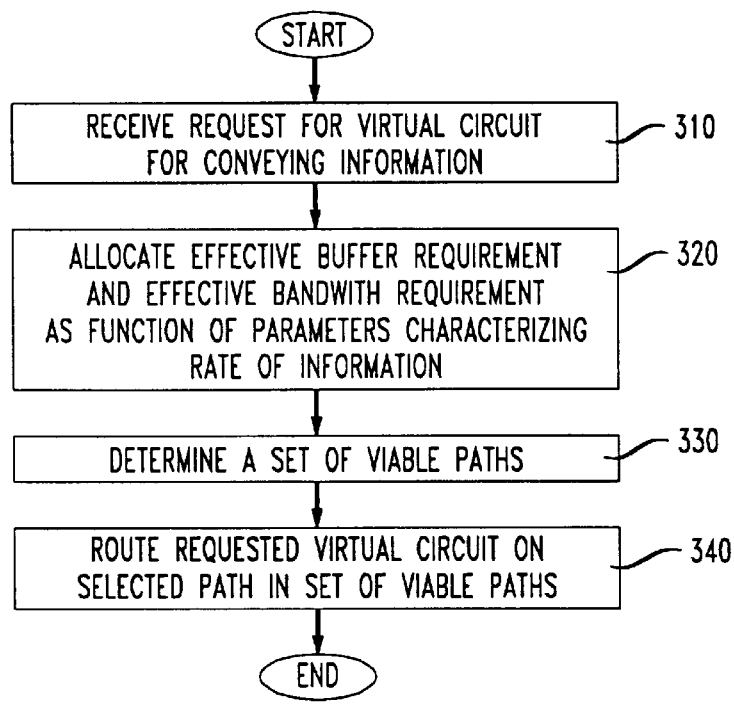
FIG. 3 is a flowchart illustrating the steps in the inventive method for admission control.

FIG. 3 illustrates the steps in the inventive method for admission control and routing by determining required network resources. In order for a first communication device to transmit information to a second communication device, a VC must be requested as in step 310, and a decision is made on whether to admit the VC to the network and how to route the VC through the network (i.e. to select a path between the two communication devices on which the VC may be routed). In one embodiment, the information is routed through an access regulator and an effective bandwidth and an effective buffer requirement are assigned to the request for a VC where the effective bandwidth and effective buffer requirement are functions of the access regulator parameters which control the flow of information from the first communication device onto the VC as shown in step 320. Once the effective bandwidth and effective buffer requirement are determined, it can be determined which paths between the two devices are viable for routing the VC in step 330. For example, if either the effective bandwidth or effective buffer requirement for a requested VC are greater than the available capacity in a link (where the available capacity is the capacity of the link minus the bandwidth required by or allocated to other VCs routed through the link) or the available buffer space in a node, the VC cannot be routed through that link and node without exceeding the capacity. Note that once the viable paths are determined, the VC can be routed as in step 340. For example, any of the viable paths could be selected at random for routing the VC. Alternatively, the method can advantageously provide information useful in choosing on which viable path to route the requested VC as for example by routing the VC on the viable path whose most heavily utilized link operates at the smallest percentage of its capacity. Alternatively, once the VC is requested, a set of potential paths between the first and second communication devices can be selected, and for each node in each potential path, a buffer space requirement and a bandwidth requirement can be allocated. The request can advantageously be routed on a viable path as a function of the bandwidth requirement so as to ensure that each node in the viable path has sufficient bandwidth to accommodate the request.

The request may advantageously be received by, and the decision on admission and routing may advantageously be made by, a network processor connected to every node in the network. In such a centralized system, the network processor has accurate information about the current level of congestion at each node, i.e. the network processor knows the content level of each node buffer and the traffic levels on links connected to each node. Alternatively, the request may be received, and decisions on routing and admission may be made, locally or in a decentralized manner at a node which node periodically receives signals which update information the node has about congestion at other nodes. Decentralized systems are more fault tolerant because no single network element makes all routing decisions. Centralized systems make decision with complete and current knowledge about congestion levels at nodes in the network rather than with information that may be dated (i.e. with knowledge that has not been updated).

The inventive method is first demonstrated in the case where the quality of service requirement is lossless performance, i.e. the network is operated so that no cells will be dropped due to exceeding available buffer space in a node or exceeding the available capacity in a link. If a virtual circuit is requested, and effective buffer requirement $b_0$ and effective bandwidth $e_0$ are determined. The determination is advantageously made as a function of the node and link parameters, i.e. the buffer size and link capacity, and of the access regulator parameters. Moreover, the ratio of the effective bandwidth $e_0$ to the capacity C of the link is advantageously proportional to the ratio of the effective buffer requirement $b_0$ to the size B of the node.

In the case where the access regulator is a leaky bucket regulator characterized by parameters, $B_T$, r and P, as described above, the effective bandwidth $e_0$ and effective buffer requirement $b_0$ of a VC routed through the access regulator is:

$$e_0 = \begin{cases} \dfrac{P}{1 + \dfrac{B/C}{B_T}(P-r)} & \text{if } r \leq \dfrac{B_T}{B/C} \\ r & \text{if } \dfrac{B_T}{B/C} \leq r < P \end{cases} \quad (1)$$

$$b_0 = \dfrac{Be_0}{C} \quad (2)$$

Note that if $e_{0,i}$ is the effective bandwidth of the $i^{th}$ VC through a node connected to a link of capacity C, then the set of circuits $\{1,2,\ldots I\}$ is admissible if $$\sum_{i=1}^{I} e_{0,i} \leq C \quad (3)$$

The admissible set may equivalently be given by $$\sum_{i=1}^{I} b_{0,i} \leq B \quad (4)$$

where $b_{0,i}$ is the effective buffer requirement of the $i^{th}$ VC through a node with buffer capacity B.

The inventive method can be expanded to the statistical multiplexing case. By statistical multiplexing it is meant that, advantageously assuming that communication devices input information to the network independently of each other, that the unutilized time varying portions of the resources allocated to VCs in the network can be used by allowing for small probabilities of loss of information. This is the lossy statistical multiplexing situation. Importantly, because the ratio of the effective bandwidth to the capacity C of the link is proportional to the ratio of the effective buffer requirement to the buffer of size B in the node, where the link is connected to the node (hereinafter the "node/link"), the problem of determining the effective allocation is reduced to a single resource allocation problem, i.e. once the effective bandwidth (buffer requirement) is known, the effective buffer requirement (bandwidth) is known. As shown more rigorously below, once a small rate of information loss is allowed, variable bit rate (VBR) traffic is found to be divisible into two classes, one for which statistical multiplexing is effective and one for which statistical multiplexing is ineffective in the sense that accepting small losses provides no advantage in terms of the number of sources that can be accommodated over requiring lossless performance. The classification of a VBR source into statistically multiplexable (SMUX) and non-statistically multiplexable (NSMUX) is likewise based on the probability of loss of information, L, and on the access regulator parameters. In particular, for given access regulator parameters and a specified probability of loss, a parameter $C_c$, termed the "critical capacity," may be advantageously defined for a source of information:

$$C_c = \dfrac{e_0 \log(1/L)}{\log(1/w)} \quad (5)$$

where $e_0$ is found from equation 1 above and w, for a leaky bucket regulator, is equal to $$\dfrac{r}{e_0}.$$

If $C > C_c$, where C is the link capacity, the source is a statistically multiplexable source. If $C \leq C_c$, the source is non-statistically multiplexable. By the terms "statistically multiplexable" and "non-statistically multiplexable" it is meant the following: if more sources of a given type can be admitted when the maximum allowed probability of loss is increased from 0 to L, then the sources are statistically multiplexable. If no more sources can be admitted, then the sources are non-statistically multiplexable.

Consider the case in which only statistically multiplexable sources are admitted to the network. It is advantageous to group VCs from these sources by class. Let J denote the number of classes, where each class is associated with a particular set of access regulator parameters (i.e. r, $B_T$, P) and $K_j$ denotes the number of VCs of class j. To determine the effective bandwidth that a request for a VC in the $j^{th}$ class should be allocated in a link of capacity C connected to a node with buffer size B, the J-class problem is broken down or decomposed into a series of single class problems. For a given acceptable information loss rate, $P_{loss}$, the maximum number of VCs of any one particular class, $K_{max,j}$, is the value of K which satisfies $$P_{loss} = \frac{\exp\{-F_K(s^*)\}}{s^* \sigma(s^*) \sqrt{2\pi}} g \qquad (6)$$

where g is a constant (typically equal to 1) and where $F_K$ and $s^*$ are functions of K, $e_0$, C and of the access regulator parameters associated with the class. Once $K_{max,j}$ is found, an effective bandwidth $e_j$ for a VC in the $j^{th}$ class can be determined.

$$e_j = \frac{C}{K_{max,j}} \qquad (7)$$

Figure 4:
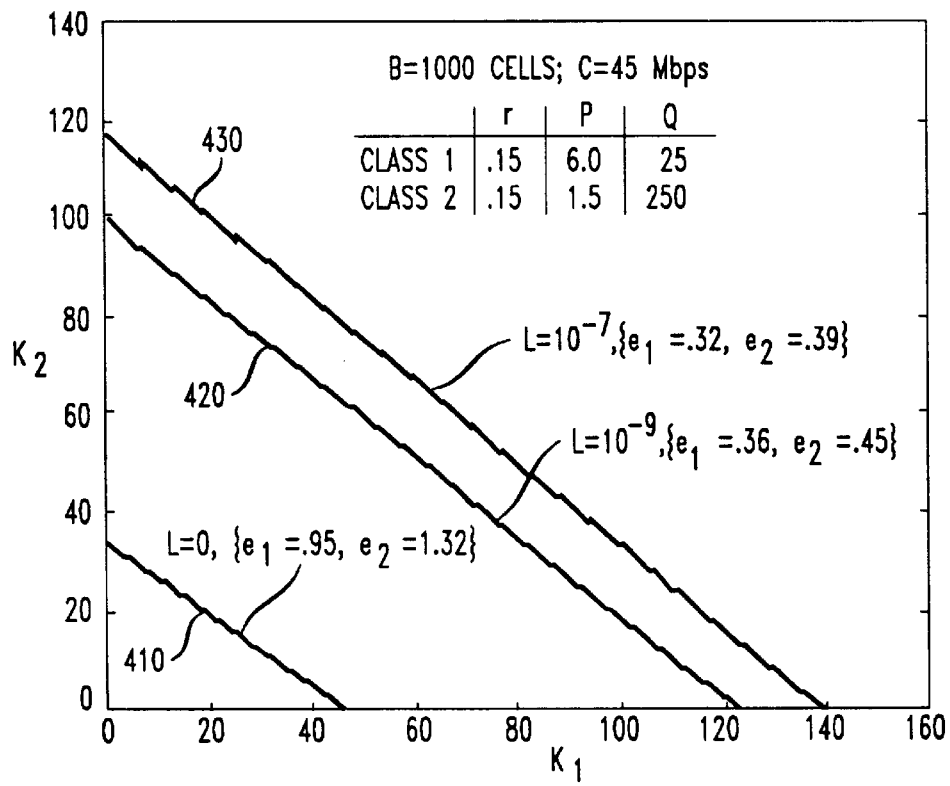
FIG. 4 illustrates an admissible region for the multiplexing of source classes for various loss probabilities.

The set of values for $K_{max,j}$, j=1,2, . . . J, define a linear boundary of the set of admissible VCs through a node with buffer size B and a link of capacity C as shown in FIG. 4 which illustrates the admissible region for the multiplexing of two source classes for various loss probabilities L. Line 410 illustrates the lossless case where the effective bandwidth for class 1 is $e_1$ and the effective bandwidth for class 2 is $e_2$. Lines 420 and 430 define the set of admissible VCs for cases where a small probability of loss is permitted. As above, the routing and admission problem can be solved by determining the number of VCs of each class already routed through a node/link and by determining if sufficient capacity at the node/link remains or is available. The remaining capacity can then be used for subsequently routed VCs.

There are alternative ways of computing the effective bandwidth $e_j$, all of which typically require substantially more effort and time than the technique above. One variant also does calculations for each class separately and in isolation, but differs in the method for computing $K_{max,j}$. Specifically, for each class a buffer distribution is computed directly, i.e., without going through the intermediate step of lossless multiplexing. This multiplexing problem is solved either by a combination of mathematical and numerical techniques or by simulations. After $K_{max,j}$ is calculated, $e_j$ is obtained from (7). Another approach, which is also typically more time consuming and complex, does not consider classes in isolation and instead computes a maximal set A of all combinations of numbers of sources of each class such that the loss is less than $P_{loss}$. Thereafter, either A is stored in tabulated form or conservatively bounded by a simplex which has only a few parameters. These few parameters define the effective bandwidth which are used in real time admission control.

Figure 5:
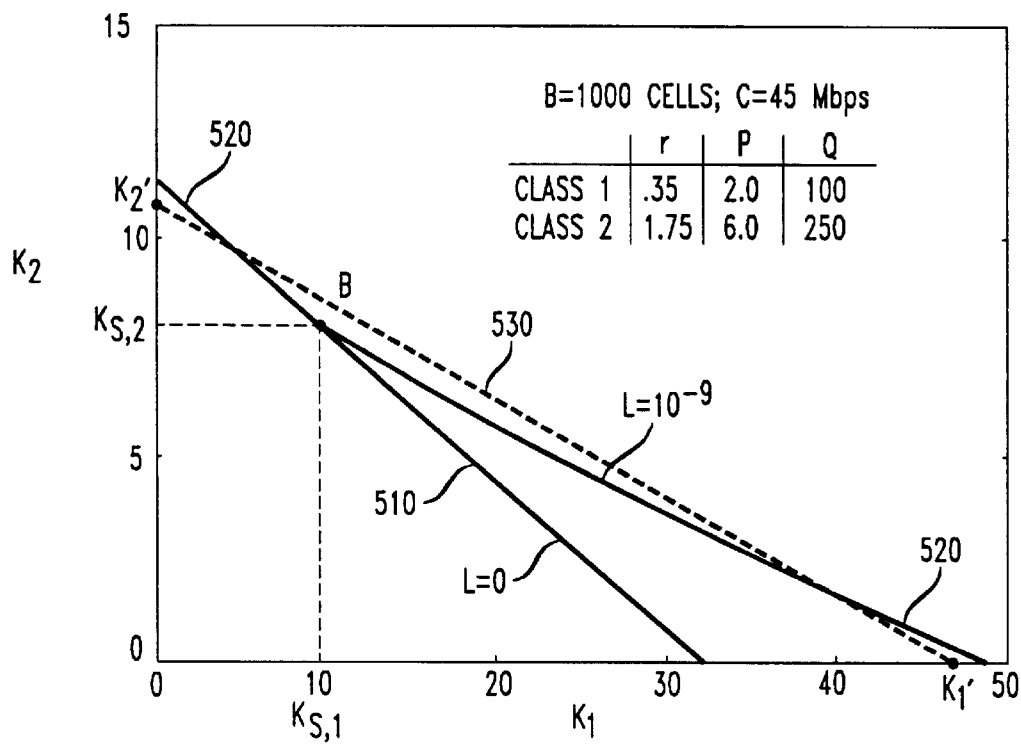
FIG. 5 illustrates an admissible region for non-statistically multiplexable sources of a first class and statistically multiplexable sources of a second class.

The inventive method may also be applied to combinations of statistically multiplexable (SMUX) and non-statistically multiplexable (NSMUX) sources. Let $K_1$, represent a number of sources in a single SMUX class and $K_2$ represent a number of sources in an NSMUX class. FIG. 5 illustrates how many sources of each class may be routed through a particular node/link. Note that line 510 illustrates the lossless case, where values of $K_1$ and $K_2$ must be selected such that the values define a coordinate that lies below line 510 thus ensuring lossless performance. Alternatively, line 520 is the line for lossy performance where the probability of loss is $10^{-9}$. Note that this curve is advantageously treated as piece-wise linear with a break point B (the coordinates for B are given in equations 63 i and 63 ii below). In order to determine an effective bandwidth for the lossy performance case, line 530, representing a linear approximation to line 520, can be is drawn. The linear approximation will intersect the $K_1$ axis at point $K'_1$ and will intersect the $K_2$ axis at the point $K'_2$. The effective bandwidth for SMUX sources in class 1, is then $$\frac{C}{K'_1},$$

and the effective bandwidth for NSMUX sources in class 2 is then $$\frac{C}{K'_2}.$$

As in previous cases, the effective bandwidth can then be used for a basis for admission and routing decisions. For example, instead of linearly approximating piece-wise line 520, the end points of the curve, i.e. where line 520 intersects the $K_1$ and $K_2$ axis, can be used as $K'_1$ and $K'_2$ for purposes of determining effective bandwidth. Note that alternatively $K'_1$ and $K'_2$ may be selected to provide a conservative determination of the effective BW.

Figure 6:
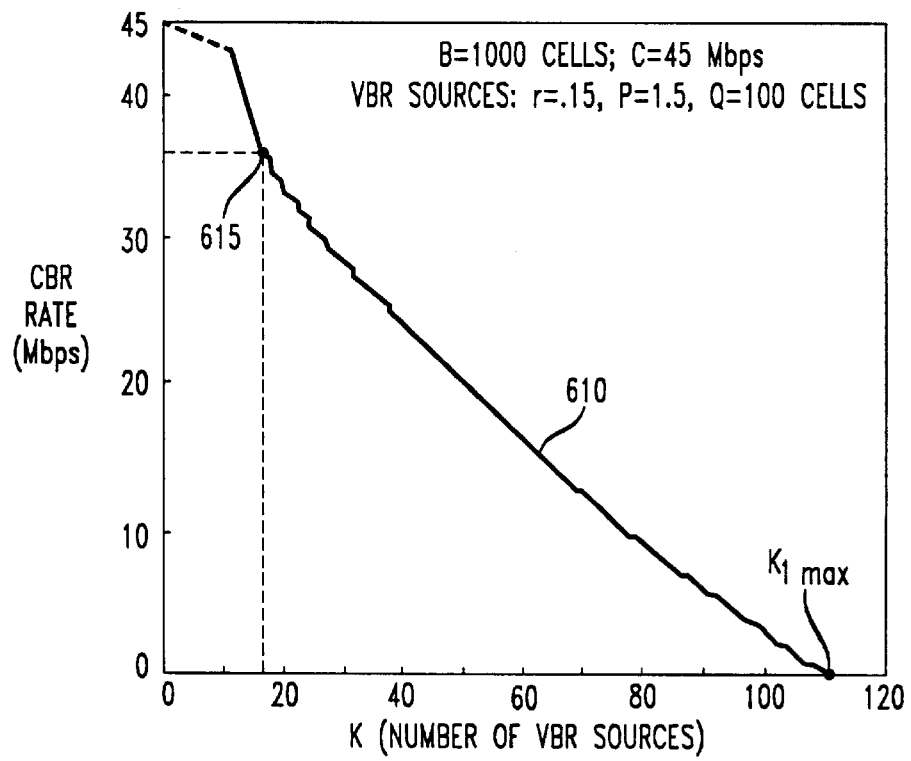
FIG. 6 illustrates an admissible region in the multiplexing of a single variable bit rate sources in the presence of constant bit rate traffic.

In the case where information from VBR and CBR (constant bit rate) communication devices input information into a network, it is demonstrated below that the admission of CRB sources modifies the effective bandwidth of VBR sources. FIG. 6 illustrates the admissible region in the multiplexing of a single VBR source class in the presence of CBR traffic. The portion of line 610 to the left of break point 615 is the region in which VBR sources of class 1 are nonstatistically multiplexable. To the right of break point 615 the VBR sources in the class are statistically multiplexable. Line 610 in FIG. 6 also demonstrates that if operating in the statistically multiplexable region, the effective bandwidth of the VBR sources in class 1 are $$\frac{C}{K_{1,max}}$$

as in the case above. However, operation in the nonstatistically multiplexable region requires an allocated bandwidth of $e_0$ as found in equation 1. The exact location of break point 615 depends on the access regulator parameters. Thus, since break point 615 defines the boundary between SMUX and NSMUX operation with their respective allocated bandwidths, the admission of CBR sources modifies the effective bandwidth of VBR sources.

Use of the inventive method in each of the above situations is considered in greater detail in the sections below.

II. Lossless Multiplexing

To increase network capacity, some networks, including BISDN networks using ATM, allow multiplexing of sources on common links. It is further possible to perform statistical multiplexing of VBR sources where a gain in efficiency (e.g. even higher network capacity) is achieved by overallocating link capacity (e.g. by admitting a number of VBR sources the sum of whose peak bit rates is greater than the link capacity) at the risk of congestion in the network and consequential cell loss when too many sources transmit at the same time. The objective of admission control here is to allow such efficiency gains while guaranteeing that quality-of-service commitments are respected for admitted virtual circuits. See, S. E. Minzer, "Broadband ISDN and Asynchronous Transfer Mode," *IEEE Comm. Mag.*, pp. 17–24, Sept. 1989.

In this section the inventive method is used to determine an effective buffer requirement $b_0$ and an effective bandwidth (capacity) $e_0$ in a node/link in a network to a request for a VC as function of access regulator parameters where the quality of service requirement is lossless performance.

Admission is denied if uncommitted resources at the nodes are inadequate to satisfy the allocation. Further, the set of admissible combinations of classes of VCs is characterized, where each VC class is associated with a particular set of parameters for the access regulator. Consider a network, such as the one in FIG. 1 in which all traffic offered by device 105-j to a node is regulated at the network edge. The regulation is illustrated by leaky bucket devices with parameters $(r, B_T, P)$; an ancillary burst-size parameter $Q$, indicative of the amount of information generated while a device is on and transmitting, is $$Q = B_T \frac{P}{P-r}.$$

Assume that the departure process from such a regulator is external, on-off and periodic with indeterminate phases which has been suggested as the worst-case in the sense of maximizing the steady-state loss probability in the node.

Figure 7:
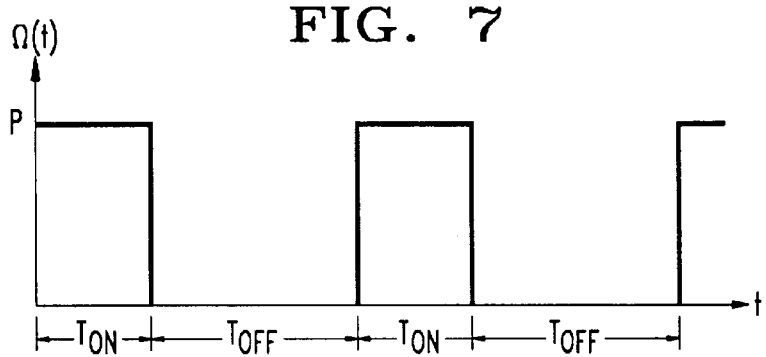
FIG. 7 illustrates a periodic, on-off process of information departing from a regulator.

Denote by $\Omega(t)$ the rate process which is the output of the regulator, see FIG. 7. In the figure $$T_{on} = \frac{B_T}{P-r}, \text{ and } T_{off} = \frac{B_T}{r}. \quad (8)$$

Let the period be denoted by $T = T_{on} + T_{off} = Q/r$. Also, the source activity factor, $$w_\Omega = Pr(\Omega > 0) = \frac{r}{P}. \quad (9)$$

Consider the base case where the quality of service requirement is lossless performance. Each virtual circuit is allocated or has effective bandwidth $e_0$ and effective buffer requirement $b_0$ and admission is denied if uncommitted resources at the node are inadequate to satisfy the allocations. A key feature is the heterogeneity of the virtual circuits and hence the goal is to characterize the set of admissible combinations of virtual circuits with various associated regulator parameters.

Figure 8:
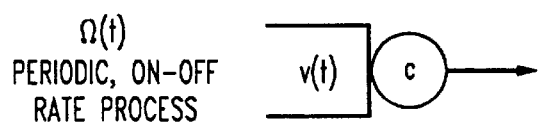
FIG. 8 is a block diagram of a virtual buffer/trunk system for a single source.

Consider a single source in a framework which is termed its Virtual Buffer/Trunk System. A single source with periodic, on-off rate process $\Omega(t)$, see FIG. 7, which supplies an infinite buffer with a trunk or link of bandwidth c, as shown in FIG. 8. Assume that $c \geq r$, is the stability condition. Let $v(t)$ and $u(t)$ respectively denote the buffer content and the utilized bandwidth at time t, where the latter is an on-off process which takes values c and 0 depending on whether the buffer is not empty or empty, respectively. See FIG. 9.

The stability condition ensures that the buffer is emptied in every cycle of length T. Let $D_{on}$ and $D_{off}$ respectively denote the time in each cycle that the buffer and the trunk is utilized. Clearly, $D_{on} + D_{off} = T$, and $D_{on}$ exceeds $T_{on}$ by the time taken by the buffer to go from its state of maximum occupancy to empty. Let b denote the maximum buffer content, $\sup_{t>0} v(t)$. Then $$D_{on} = T_{on} + \frac{b}{c}, D_{off} = T_{off} - \frac{b}{c}. \quad (10)$$

Hence w, fraction of time that the virtual buffer/trunk system is busy, $$w = \frac{D_{on}}{D_{on}+D_{off}} = \frac{T_{on}}{T_{on}+T_{off}} + \frac{b}{c} \cdot \frac{1}{T_{on}+T_{off}} = w_\Omega + \frac{b}{c} \cdot \frac{1}{T}. \quad (11)$$

Importantly, $w \geq w_\Omega$. Also, $$b = B_T - \frac{B_T(c-r)}{P-r}. \quad (12)$$

Hence $b \leq B_T$. Note that b decreases linearly with increasing c for $r \leq c \leq P$, and that the extreme points of (b,c) are $(B_T, r)$ and (0,P).

Now the behavior of the processes of the virtual buffer/trunk system for single sources can be used to design admission control for heterogeneous sources sharing the nodal resources.

First, suppose there is a set of I virtual circuits such that the traffic source for circuit i $(1 \leq i \leq I)$, is an on-off process $\Omega_i(t)$. The aggregate traffic $$\sum_{i=1}^{I} \Omega_i(t),$$

will be associated with buffer content $V(t)$ and a utilized bandwidth $U(t)$, where the latter is an on-off process which takes values C and 0.

Consider assigning each virtual circuit a virtual buffer/trunk. Circuit i would be allocated bandwidth $c_i$ $(r \leq c_i \leq P)$, and also buffer $b_i$, the peak buffer occupancy given in (12). Then, if $$\sum_{i=1}^{I} c_i \leq C, \quad (13)$$

it follows that $$\sum_{i=1}^{I} u_i(t) \leq C \quad (14)$$

and $$\sum_{i=1}^{I} v_i(t) \geq V(t). \quad (15)$$

Thus, the sum of the virtual buffer usages bounds the aggregate buffer usage. The sum of the virtual buffer usages, $$\sum_{i=1}^{I} v_i(t),$$

shall conservatively be used as an estimate of the aggregate buffer usage $V(t)$. Equation 15 implies that if the estimate does not exceed the available buffer B, then neither will the actual buffer usage.

In the case where all sources are identical except for phase, then $$\sum_{i=1}^{I} b_i = \sup_{phases,t} \left\{ \sum_{i=1}^{I} v_i(t) \right\} = \sup_{phases,t} \{V(t)\}. \quad (16)$$

Thus, in this case the estimate accurately predicts the maximum buffer usage, and hence the boundary between lossless and lossy transmission. The estimate will be less precise when dissimilar sources are involved, or when small losses are allowed.

The main concern now is the selection of the parameters $c_i$, which are free at this point. If all the sources are known and are heterogeneous, then determining the values $c_i$ which produce the lowest estimated peak buffer usage without exceeding the total bandwidth constraint (13) involves a complicated optimization. A simplification results if the $c_i$ for a particular source must be chosen independent of any knowledge of the character of other sources. Straightforward optimal resource management requires that the per-circuit allocations ($b_i, c_i$) be such that both network resources will always be exhausted at the same time for any aggregation of circuits using the same allocation rule. This occurs when $$\frac{b_i}{B} = \frac{c_i}{C}, \tag{17}$$

i.e., when the allocations are in proportion to their respective nodal capacities. Although cases will sometimes be considered where all sources are taken to be known, (17) will continue to be abided by because of the simplification it provides. Using (17) in lieu of doing a calculation invoking simultaneous knowledge of all circuits leads to admission decisions which are exact if all sources are identical, but conservative if sources are heterogeneous.

Figure 10:
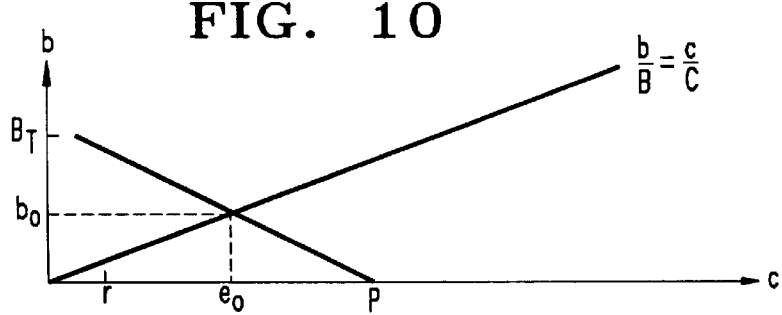
FIG. 10 illustrates the determination of buffer space requirement and effective bandwidth.

Observe that for given B and C, (12) and (17) determine a unique allocation denoted by ($b_0, e_0$). The solution is depicted in FIG. 10. The quantity $e_0$, which is of importance, is referred to as the "effective bandwidth for lossless performance". The justification for the term stems from the fact that if $e_{0,i}$ is the effective bandwidth of the $i^{th}$ virtual circuit, then the set of circuits $\{1,2,\ldots,I\}$ is admissible if $$\sum_{i=1}^{I} e_{0,i} \leq C. \tag{19a}$$

The admissible set may equivalently be given by $$\sum_{i=1}^{I} b_{0,i} \leq B,$$

where $b_{0,i}$ is the "effective buffer requirement" for virtual circuit i; however, the former description will be used.

Exceptions to the above procedure arise if there is no intersection of the straight lines in FIG. 10. An intersection at ($b_0, e_0$) exists if and only if $$\frac{C}{B} > \frac{r}{B_T}. \tag{19b}$$

Sources which violate (19a) are "bandwidth-limited" and in such cases a natural choice for the allocated bandwidth is $$e_0 = r. \tag{20}$$

There are the following options available in the corresponding buffer allocations: (i) $b_0 = rB/C$, or (ii) $b_0 = B_T$. The former allocation, which in effect inflates $B_T$ to $rB/C$ and is therefore more liberal, has the advantage that the administration of admission control and resource allocation is routine, i.e., as if (19a) holds. This option is recommended if the margin of violation of (19) is small, which is more typical. On the other hand, if the margin is large and the second option is followed then it is necessary to go to the extreme length of recalculating the residual B and C available to the non-bandwidth-limited sources whenever such a bandwidth-limited virtual circuit is admitted to the network. This procedure has large consequences and is identical to one that developed for the important case of CBR traffic, which constitutes the limiting case of bandwidth-limited sources.

Formulas for $e_0$ and w, which will be useful later are:

$$e_0 = \begin{cases} \frac{\frac{P}{1+B/C}}{B_T}(P-r) & \text{if } r \leq \frac{B_T}{B/C} \\ r & \text{if } \frac{B_T}{B/C} \leq r \leq P \end{cases} \tag{21}$$

$$w = \frac{w_Q P}{e_0} = \frac{r}{e_0} \tag{22}$$

Note that in the above expressions $e_0$ and w depend on the nodal buffer B and bandwidth C only through B/C. This important fact should not be surprising since the ratio of buffer and bandwidth allocated to individual sources is equal to the ratio of the buffer and bandwidth at the node.

The formula for $e_0$ perhaps is most easily remembered when expressed in terms of different variables:

$$e_0 = \begin{cases} \frac{P}{1+\frac{T_{buf}}{T_{on}}} & \text{if } T_{buf} \leq T_{off} \\ r & \text{if } T_{off} \leq T_{buf} \end{cases} \tag{23}$$

where $$T_{buf} = \frac{B}{C} \tag{24}$$

is the maximum delay time of the buffer.

II. Statistical Multiplexing

In this section additional advantages of the inventive method are realized by extracting statistical multiplexing gains both from 1) the assumption of statistical independence of communication devices, and 2) the exploitation of the unutilized time varying portions of the allocated resources to VCs while allowing for small probabilities of loss of information (i.e. the lossy statistical multiplexing situation). Importantly, the notion that the per-circuit allocations are such that both bandwidth and buffer network resources are exhausted at the same time, as in the previous section, is used in the lossy statistical multiplexing situation to reduce the problem of bandwidth and buffer allocation to a single resource allocation problem.

An overview of the method is as follows—VCs are advantageously grouped by classes. Let J denote the number of classes, where each class $j, j=1,2,\ldots J$, is associated with a particular set of access regulator parameters, and let $K_j$ denote the number of VCs of class j. To determine the effective bandwidth a VC in the $j^{th}$ class should be allocated at a node of capacity C (ie. to determine $e_j^u$ the effective bandwidth for that class), the multiclass problem is broken down into a series of single class problems. For a given acceptable information loss rate, $P_L$, the maximum number of VCs of any one particular class, $K_{max,j}$, is determined using the expressions below. Then, the effective bandwidth for the $j^{th}$ class is found according to: $e_j^u = C/K_{max,j}$. The set of values for $K_{max,j}$ form the boundary of the set of admissible VCs through the node. For each class j, the parameters $e_{o,j}$ and $b_{o,j}$ can be determined, as described in the previous section, and the gain g due to statistical multiplexing can then be defined as: $g_j = e_{o,j}/e_j^u$ ($j=1,2,\ldots,J$).

Figure 9:
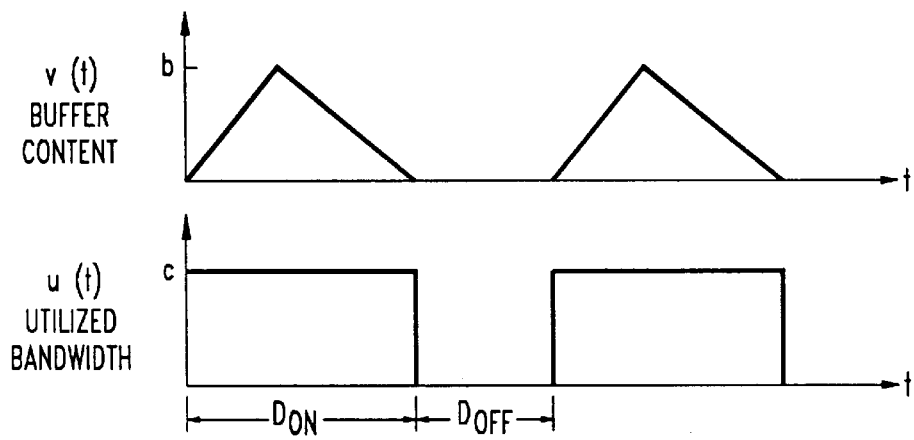
FIG. 9 illustrates the buffer content and utilized bandwidth for a virtual system for a single source.

Begin with the characterization of the $i^{th}$ virtual circuit of class j by two stationary random processes $u_{ji}(t)$ and $v_{ji}(t)$, which respectively denote the utilized bandwidth and buffer content for the circuit's virtual buffer/trunk system. As shown in FIG. 9, these two processes are synchronized in their on-off behavior. To make their correspondence closer for ease of analysis, the process $v_{ji}(t)$ shall be conservatively bounded shall be conservatively bounded by an on-off process, which takes the peak value for the on period. Thus $u_{ji}(t)$ and $v_{ji}(t)$ are viewed as two synchronized on-off processes, which respectively take values $e_{0,j}$ and $b_{0,j}$ while on and 0 while off. The parameters $e_{0,j}$ and $b_{0,j}$ are calculated by the procedure in the preceding section. With this formalism in place, only one of either $u_{ji}(t)$ or $v_{ji}(t)$ needs to be considered, and the former is chosen.

On account of the assumed statistical independence of traffic sources, the processes $u_{ji}(t)$ ($i=1,2,\ldots,K_j$) of the same source class have identical templates and differ only in their phase, i.e., $$u_{ji}(t)=u_j(t+\theta_{ji}), \quad (25)$$

where $u_j(t)$ is a deterministic, periodic on-off function with period $T_j$, which takes values $e_{0,j}$ and 0 for fractions $w_j$ and $(1-w_j)$, respectively; the phases $\theta_{ji}$ are independent random variables uniformly distributed in the interval $T_j$.

The performance measure is the loss probability $P_{loss}$, $$P_{loss}=Pr(U>C), \quad (26)$$

where the total instantaneous load $$U = \sum_{j=1}^{J} \sum_{i=1}^{K_j} u_{ji}.$$

Hence $P_{loss}$ is the fraction of time that the aggregated demand for bandwidth from all sources exceeds the nodal bandwidth. From the earlier discussions, time periods during which losses occur at the network node due to a full buffer are contained in periods during which $U(t)>C$. Take for our quality of service requirement, $$P_{loss} \leq L, \quad (27)$$

where L is a small number, such as $10^{-9}$.

The primary means for estimating $P_{loss}$ is the Chernoff bound, which is reviewed here, and a refined large deviations approximation based on it, which is described below. The instantaneous loads $u_{ji}$ are independent, nonnegative random variables with moment generating functions $$M_j(s) = E[\exp(su_{ji})] = \int_0^\infty e^{sx} dN_j(x), \quad (28)$$

where $$N_j(x) = Pr(u_{ji} \leq x). \quad (29)$$

Chernoff's bound gives, $$\log P_{loss} \leq -F_K(s^*), \quad (30)$$

where $$F_K(s) = sC - \sum_{j=1}^{J} K_j \log M_j(s) \quad (31)$$

and $F_K(s^*) = \sup_{s \geq 0} F_K(s)$.

If $C \to \infty$ and $K_j/C = O(1)$, then $$\log P_{loss} = -F_K(s^*)\left[1 + O\left(\frac{\log C}{C}\right)\right]. \quad (32)$$

Hence the asymptotic large deviations approximation is $P_{loss} \sim \exp(-F_K(s^*))$.

To avoid trivialities assume the stability condition, $$\sum_{j=1}^{J} K_j E(u_{ji}) < C, \text{ and } \lim_{s \to \infty} \sum_{j=1}^{J} K_j \frac{M'_j(s)}{M_j(s)} > C, \quad (33)$$

(the prime denotes derivative) since without the latter condition there is no loss.

Also note that $$F'_K(s) = C - \sum_{j=1}^{J} K_j \frac{M'_j(s)}{M_j(s)}. \quad (34)$$

It is easy to verify that $F_K(S)$ is a strictly concave function with a unique maximum at $s=s^*$, which is the positive root of the equation $F'_K(S)=0$.

Of particular interest here is the case of binomially distributed $u_{ji}$, where $w_j = Pr(u_{ji} = e_{0,j})$ and $1-w_j = Pr(u_{ji}=0)$. Then $$F_K(s) = sC - \sum_{j=1}^{J} K_j \log\{1 - w_j + w_j \exp(se_{0,j})\}, \quad (35)$$

and s is obtained by solving the equation $$\sum_{j=1}^{J} \frac{K_j w_j e_{0,j} \exp(se_{0,j})}{1 - w_j + w_j \exp(se_{0,j})} = C. \quad (36)$$

In the single-class case, i.e. $J=1$, the resulting expressions are illuminating: for $\alpha=(C/e_0)/K$, $$s^* = \frac{1}{e_0} \log\left[\frac{a}{1-a} \cdot \frac{1-w}{w}\right], \quad (37)$$

$$F_K(s^*) = K\left[a\log\left(\frac{a}{w}\right) + (1-a)\log\left(\frac{1-a}{1-w}\right)\right]. \quad (38)$$

The above expression may be used to obtain $K_{max}$, which is the value of K for which $$F_K(s^*) = \log(1/L) \quad (39)$$

In light of (27) and (30), the quality of service requirement on $P_{loss}$ is satisfied for all $K \leq K_{max}$. Similarly, in the case of multiple classes, of interest is the admissible set $$A_L(B,C) = \{K: F_K(s^*) \geq \log(1/L)\} \quad (40)$$

Since the complement of the admissible set is convex, the points on the boundary, which are denoted by $\delta A_L$, also satisfy (39) with K replaced by J-tuples $(K_1, \ldots, K_j)$.

For a wide variety of conditions the boundary $\delta A_L$ is closely approximated by an appropriately chosen linear hyperplane. (There are notable exceptions, however, even in these cases the boundary is approximately piece-wise linear and hence the following comments apply with obvious modification.) For instance, and a point $\tilde{K}$ on $\delta A_L$ may be picked and the tangent hyperplane to $\delta A_L$ which touches $\delta A_L$ at $\tilde{K}$ may be obtained. Let the region constrained by this hyperplane by denoted by $\tilde{A}_{L,\tilde{K}}$. Clearly, from the aforementioned concavity of $A_L$, $\tilde{A}_{L,\tilde{K}}$ is a conservative bound to $A_L$. Moreover, denoting $$\tilde{A}_{L,\tilde{K}} = \left\{ K: \sum_{j=1}^{J} K_j e_j \leq C \right\}, \quad (41)$$

the parameters $e_j$ which define $\tilde{A}_{L,\tilde{K}}$ are readily obtained:

$$e_j = \frac{\log M_j(\tilde{s}^*)}{\tilde{s}^* + (\log L)/C} \quad (j=1,2,\ldots,J), \quad (42)$$

where $\tilde{s}^*$ is where $F_{\tilde{K}}(s)$ is maximized.

The quantity $e_j$ may justifiably be called the effective bandwidth of class j traffic sources. The statistical multiplexing gain g compares this quantity to $e_{o,j}$, which is the effective bandwidth for lossless performance, $$g_j = e_{o,j}/e_j \quad (j=1,2,\ldots,J). \quad (43)$$

In numerical investigations the end results have been found to be fairly insensitive to reasonable choices of $\tilde{K}$. One selection which works well is $\tilde{K}_j = K_{max,j}/2$, where $K_{max,j}$ is the maximum number of admissible sources when only class j sources are admitted.

An optimistic (upper) bound of $A_L$, which follows from the aforementioned concavity of the admissible region is $$\left\{ K: \sum_{j=1}^{J} K_j e_j^u = C \right\}, \quad (44)$$

where $e_j^u = C/K_{max,j}$. These optimistic estimates of the effective bandwidths are considerably easier to calculate, since they are obtained by considering each source class in isolation, and in many cases are quite close to the conservative estimates in (42). Such is the case when $\delta A_L$ is close to being linear.

In numerical investigations a refinement is used to the large deviations approximation (32) and bound (30). For the asymptotic scaling in which $K_j/C = O(1)$ and $C \to \infty$, the refined approximation is $$P_{loss} = \frac{\exp\{-F_K(s^*)\}}{s^* \sigma(s^*) \sqrt{2\pi}} \left[ 1 + O\left[ \log \frac{C}{C} \right] \right] \quad (45)$$

where $s^*$ is obtained by solving $F'_K(s) = 0$, i.e., exactly as before, and $$\sigma^2(s) = \frac{\partial^2}{\partial s^2} \log E[e^{sU}],$$

where U is the total instantaneous load, see (26). More specifically, $$\sigma^2(s) = \sum_{j=1}^{J} K_j \left[ \frac{M''_j(s)}{M_j(s)} - \left\{ \frac{M'_j(s)}{M_j(s)} \right\}^2 \right]. \quad (46)$$

In the particular case of binomially distributed random variables $u_{ji}$, the quantities in the above expression have appeared before, except for $M''_j(s)$ which is given by $w_j e_{0,j}^2 \exp(se_{0,j})$.

The dominant exponential (in C) term is common to both the base and refined large deviations approximations. Hence, the fundamental qualitative properties are not affected. It is more convenient to conduct a qualitative investigation in terms of the simpler base approximation. In quantitative terms a rough rule of thumb is that the refinement adds about 10% to the calculated nodal capacity.

A qualitative theory may be developed based on the above results. The existence of solutions K to the equation given earlier for determining the boundary $\delta A_L$ of the admissible set, namely, $$F_K(s^*) = \log(1/L) \quad (47)$$

are examined in detail. A topic addressed here is whether the admissible set $A_0$ for lossless performance is a proper subset of $A_L$, i.e., whether statistical multiplexing gains exist. Conditions under which the sets $A_0$ and $A_L$ coincide either completely or partially are also determined. When only a single source class exists these results illuminate conditions under which the statistical multiplexing gain, $g = e_0/e$ either exceeds or equals unity. It is shown that there exist critical values $C_c$, such that if $C \leq C_c$ then $g = 1$ and if $C \leq C_c$ then $g \geq 1$. Similar critical values $r_c$ exist for the token rate. Simple expressions for $C_c$ and $r_c$ are obtained. For given nodal bandwidth C, statistically-multiplexable and non-statistically-multiplexable VBR source classes are obtained. In the context of multiple source classes results on the constitution of the boundary of the admissible set are obtained. The results here help to explain the observations from numerical investigations, which are reported in the next section, on the almost-linearity of the boundary of the admissible in the presence of only S-VBR sources, and the qualitatively different boundary, with piece-wise linear segments, which is obtained when both S-VBR and NS-VBR sources are present.

From (38), $$\frac{\partial}{\partial K} F_K(s^*) = \log\left( \frac{1-a}{1-w} \right) \quad (48)$$

where $\alpha = C/(Ke_0)$. From the stability condition (33), $w < a$. Hence $\delta F_K(s^*)/\delta K < 0$. Also, for $K = C/e_0 + 0, \delta F_K(s^*)/\delta K = -\infty$, and, importantly, $$F_K(s^*) = \frac{C}{e_0} \log(1/w). \quad (49)$$

From the expression for $s^*$ in (37), $$s^* = \frac{1}{e_o} \log\left[ \frac{1}{K - C/e_0} \cdot \frac{c}{e_0} \cdot \frac{1-w}{w} \right], \quad (50)$$

it follows that $s^* \to \infty$ as $K \to C/e_0 + 0$, and $s^* = 0$ for $$K = \frac{1}{w} \frac{C}{e_0}.$$

The following summarizes the salient features of $F_K(s^*)$.

Proposition 1 With C, w, $e_0$ held fixed, and K in the interval $$\left[ \frac{C}{e_0}, \frac{1}{w} \frac{C}{e_0} \right]$$

(i) $F_K(s^*)$ is monotonic, strictly decreasing with increasing K.

(ii) For $$K = C/e_0 + 0, s^* = \infty, \frac{7}{\partial K} F_K(s^*) = -\infty \text{ and}$$

$$F_K(s^*) = \frac{C}{e_0} \log(1/w).$$

In particular, $$\frac{C}{e_0} \log(1/w)$$

is the maximum value of $F_K(s^*)$ and it is achieved at $K=C/e_0$.

Now consider the calculation of $K_{max}$, the largest value of K for which $P_{loss} \leq L$, which is given by the solution K of $F_K(s^*)=\log(1/L)$. Observe the following dichotomy: if $$\log(1/L) < \frac{C}{e_0} \log(1/w),$$

the maximum value of $F_K(s^*)$, then $K_{max} > C/e_0$. Hence the statistical multiplexing gain $g=e_0/e>1$, since $e=C/K_{max}$. If, on the other hand, $$\log(1/L) \geq \frac{C}{e_0} \log(1/w)$$

then no solution to (51) exists; however, it is known independently that for $K=C/e_0$, $P_{loss}=0$ and hence $K_{max}=C/e_0$. In this case, $g=1$. The above facts are now summarized.

Definition. The critical bandwidth $C_c$ is the smallest quantity such that the statistical multiplexing gain exceeds unity for all $C>C_c$. Tacit to the above definition is the assumption that B varies with C in such a manner that B/C is held fixed.

Proposition 2

$$C_c = \frac{e_0 \log(1/L)}{\log(1/w)} \quad (51)$$

Recall from (21) and (22) that an implication of our resource allocation procedure is that $e_0$ and w depend on the nodal resource capacities B and C only through B/C. Hence this is also true for $C_c$.

Conditions in (33) give $$\sum_{j=1}^{J} K_j w_j e_{0,j} < C < \sum_{j=1}^{J} K_j e_{0,j}.$$

Also, for $C \geq \Sigma K_j e_{0,j}$ obviously $P_{loss}=0$. The main result is Proposition 3

(i) $F_K(s^*)$ has a maximum value $m_F$, where $$m_F = \max_{1 \leq j \leq J} \frac{C}{e_{0,j}} \log(l/w_j) \quad (52)$$

(ii) Say that the above maximum is reached at an unique $j^*$. Then $F_K(s^*)$ reaches its maximum value at the following unique corner point K:

$$K_j = C/e_{0,j} \quad \text{if } j = j^* \quad (53)$$
$$= 0 \quad \text{otherwise.}$$

(iii)

If $\log(1/L) > m_F$ then $A_L = A_0$. (54)

If $\log(1/L) < \min_j \frac{C}{e_{0,j}} \log(1/w)$ then $A_0 \subset A_L$. (55)

Otherwise $A_0 \subseteq A_L$, i.e., the boundaries of $A_0$ and $A_L$ coincide in part and elsewhere $A_L$ subsumes $A_0$. Specifically, K on the boundary of $A_0$ such that $\Sigma K_j \log(1/w_j) \leq \log(1/L)$ is also on the boundary of $A_L$, and when the inequality is false K is contained in the proper interior of $A_L$.

Proof: Observe from (36) that as $$s^* \to \infty, \sum_j K_j e_{0,j} \to C.$$

Hence, for $$\Sigma_j K_j e_{0,j} = C,$$

from (35), $$F_K(s^*) = \sum_{j=1}^{J} K_j \log(1/w_j) + s^* \left( C - \sum_{j=1}^{J} K_j e_{0,j} \right) \quad (56)$$

$$= \sum_{j=1}^{J} K_j \log(1/w_j)$$

Next, $$\frac{\partial}{\partial K_i} F_K(s^*) = -\log(1 - w_i + w_i e^{s^* e_{0,j}}) < 0. \quad (57)$$

Similarly, by taking the derivative of both sides of (36) with $K_i$, then $$\frac{\partial s^*}{\partial K_i} < 0. \quad (58)$$

At this point observe that various features of the analysis for the single class carry over naturally to the case of multiple classes, namely, on $\delta A_0 = \{K : \Sigma K_j e_{0,j} = C\}, s^* = \infty$ and $F_K(s^*) = \Sigma K_j \log(1/w_j)$, and as K increases in any direction away from $\delta A_0$, $s^*$ and $F_K(s^*)$ decrease.

Now consider the behavior of $F_K(s^*) = \Sigma K_j \log(1/w_j)$ on $\delta A_0$. Since this function is linear in K, its maximum on $\delta A_0$ is reached at its boundary, typically a corner point. At the $j^{th}$ corner point, where $K_i = C/e_{0,j}$ if $i=j$ and $K_i = 0$ otherwise, $F_K(s^*) = (C/e_{0,j})\log(1/w_j)$. Hence the results in (i) and (ii) are found.

Next consider the multiple class version of the problem considered previously for the single class, namely, the existence of solutions K in (47). If $\log(1/L) > m_F$ then clearly no solution exists. In this case, as with a single class, the requirement $P_{loss} < L$ can only be met by having $P_{loss} = 0$, i.e., by restricting K to $A_0$. Hence, in this case $A_L = A_0$. On the other and, if $F_K(s^*) > \log(1/L)$ for all K on $\delta A_0$ then, from the aforementioned range and monotonicity of $F_K(s^*)$, solutions K to (47) exist in the complement of $A_0$. Hence $A_0 \subset A_L$. Finally, consider the mixed case where $F_K(s^*) < \log(1/L)$ for some K on $\delta A_0$ and the inequality is reversed for other K on $\delta A_0$. In this case any K on $\delta A_0$ for which the inequality holds is such that (47) does not have a solution and hence such a K is also an element of $\delta A_L$. Hence, any K on $\delta A_0$ for which $\Sigma K_j \log(1/w_j) < \log(1/L)$ is also an element of $\delta A_L$. Moreover, all other K on $\delta A_0$ are contained in the proper interior of $A_L$.

This concludes the proof of Proposition 3.

To illustrate the result for a two-class model consider three cases:

(i) $\log(1/L) > m_F$, ie., $C < \min(C_{c,1}, C_{c,2})$ (59)

(ii) $\log(1/L) < \min_j \left\{ \frac{C}{e_{0,j}} \log(1/w_j) \right\}$, i.e., $C > \max(C_{c,1}, C_{c,2})$ (60)

iii) $C_{c,1} < C < C_{c,2}$, (61)

where $C_{c,j}$ is the critical bandwidth for class j:

$$C_{c,j} = e_{0,j}\log(1/L)/\log(1/w_j), \quad j=1,2. \tag{62}$$

Figure 11A:
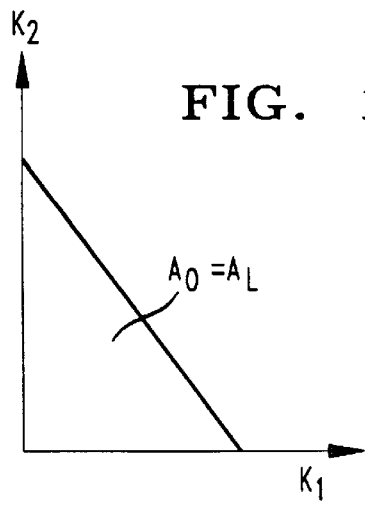
FIGS. 11A–C illustrates several possible admissible sets and statistical multiplexing gains for two traffic source classes.
Figure 11B:
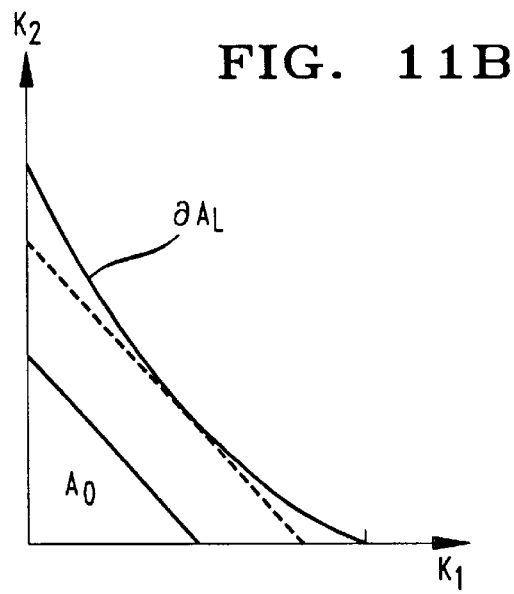
Figure 11C:
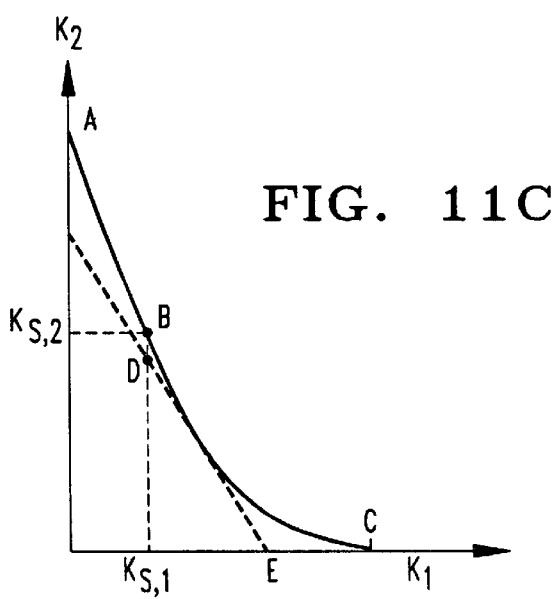

According to Proposition (49), for case (i) $A_L = A_0$. This situation is sketched in FIG. 11(A), note that the admissible set is a simplex. The performance implication is that there is no statistical multiplexing gain in this case. For this reason both source types are NS-VBR, i.e., "bad" in the sense that the sources are too "large" with respect to the node bandwidth. For case (ii), the result states that $A_0$ is a proper subset of $A_L$, as sketched in FIG. 11(B), (ii). In this case the statistical multiplexing gain exists and both source types are S-VBR. The final case (iii) is sketched in FIG. 11(C), (iii). The boundary of the admissible set is ABC, in which the segment AB is linear and coincides with the boundary of $A_0$, namely, $\{K: \Sigma K_j e_{0,j} = C\}$, while the segment BC is convex. The breakpoint B has coordinates $K_s$ which the result gives:

$$K_{s,1} e_{0,1} + K_{s,2} e_{0,2} = C \tag{63,i}$$

$$K_{s,1}\log(1/w_1) + K_{s,2}\log(1/w_2) = \log(1/L) \tag{63,ii}$$

Note that for $K_1 > K_{s,1}$ the boundary segment BC lies entirely above the linear extension of AB, with the difference attributable to the statistical multiplexing gain. Of course no such gain exists for $K_1 < K_{s,1}$. In this case class 1 is S-VBR and class 2 is NS-VBR for the given link bandwidth (and, implicitly, node buffer). The breakpoint $K_s$ is clearly important for operations and design because, first, it demarcates between two different sets of effective bandwidths, and secondly, there are obvious performance benefits in operating to the right of the breakpoint since the effective bandwidth of class 1 sources is smaller.

In the sketch of FIG. 11, (iii) it is shown the linear segment DE which is tangent to BC at an intermediate point. As the numerical results indicate, in many cases the departure from linearity of boundary segments represented by BC is slight, in which case DE is close to BC throughout.

An important observation is the sensitivity of the statistical multiplexing gain, $g = e_0/e$, on the token rate r. Here a complementary qualitative result is presented which establishes that with all parameters except r held fixed, there exists a critical value of r, denoted by $r_c$, which separates token rates for which the statistical multiplexing gain exists, i.e. $g > 1$, from those for which $g = 1$. For simplicity consider the case of a single class.

Recall that if $(C/e_0)\log(1/w) \leq \log(1/L)$ then the maximum number of sources that is admissible, $K_{max} = C/e_0$ and hence $e = e_0$. On the other hand, if $(C/e_0)\log(1/w) > \log(1/L)$ then $K_{max} > C/e_0$, and $e_0 > e$. Denote $$f(r) \triangleq \frac{C}{e_0}\log(1/w), \tag{64}$$

so that $g > 1$ if and only if $f(r) > \log(1/L)$. In (54) let r be varied, while the other parameters, B, C, P, and $B_T$, are held fixed; note that $e_0$ and w depend on r as given in (21) and (22). Note that $f(r)$ is a monotonic, strictly decreasing function of r for r in $(0, B_T C/B)$. This is because both $e_0$ and w increase with r. Moreover, $f(r) \to \infty$ as $r \to 0+$ and $f(B_T C/B) = 0$. For $r > B_T C/B$, as discussed earlier, $e_0 = r$ and $w = 1$, and hence $f(r) = 0$. Consequently, there exists an unique solution $r_c$ to $$f(r) = \log(1/L), \tag{65}$$

with the property that $f(r)$ is greater or less than $\log(1/L)$ depending on whether r is less or greater than $r_c$. Hence:
Proposition 4 Let B, C and the source parameters P and $B_T$ be fixed. The statistical multiplexing gain g exceeds 1 if and only if $r < r_c$. The critical token rate $r_c$ is the unique solution r to the equation $$\frac{C}{e_0}\log(1/w) = \log(1/L), \tag{66}$$

where $e_0$ and w depend on r as given in (21) and (22).

It is also of interest to examine the case where the mean rate r and period T are held fixed, and the source activity factor $w_\Omega$ is varied. Varying $w_\Omega$ is equivalent to varying the peak rate P, since $P = r/w_\Omega$. Some algebraic manipulation of (66) reveals that the critical token rate $r_c$ may be written as $$r_c = \frac{C}{\log\left(\frac{1}{L}\right)} \left(w_\Omega + \frac{T_{buf}}{T}\right) \log\left[\left(w_\Omega + \frac{T_{buf}}{T}\right)^{-1}\right] \tag{67}$$

for $$w_\Omega + \frac{T_{buf}}{T} < 1. \tag{68}$$

When (68) is violated, $e_0 = r$ and $r_c = 0$.

The character of (67) is as follows. At $w_\Omega = 0$, $r_c$ has the value $r_{c,0} = C/[e \log(1/L)]$. As $w_\Omega$ is varied, $r_c$ achieves a peak value $r_{c,max}$ $$r_{c,max} = \begin{cases} \frac{CT_{buf}}{T\log(1/L)} \log\left(\frac{T}{T_{buf}}\right) & \text{if } \frac{T_{buf}}{T} < e^{-1} \\ r_{r,0} & \text{if } \frac{T_{buf}}{T} \geq e^{-1}. \end{cases} \tag{69}$$

If $r_{c,max} < r$ then the multiplexing gain g will be 1 for all values of $w_\Omega$. If $r < r_{c,0}$ then there will be a critical value $w_{\Omega,c2}$ such that $g > 1$ for $w_\Omega < w_{\Omega,c2}$ and $g = 1$ for $w_\Omega < w_{\Omega,c2}$. If $T_{buf}/T < e_{nat}^{-1} t$, then there is a third possibility, namely, that $r_{c,0} < r < r_{c,max}$. In this case, there is an additional critical value, $w_{\Omega,c1}$, such that if $w_\Omega < w_{\Omega,c1}$, then $g = 1$.

This analysis provides a possible perspective on the ways in which NS-VBR traffic can arise: statistical multiplexing can be impossible because (i) the mean rate r is too large; or (ii) the traffic is too smooth ($w_\Omega$ is large); or (iii) there is little buffering and the peak rate P is large ($w_\Omega$ is small).

IV. Statistical Multiplexing of CBR and VBR Sources

The inventive method embodies the recognition that when only a single class of statistically homogeneous traffic is present, the statistical multiplexing gain exceeds unity only if the capacity of a single resource (e.g., the link bandwidth) exceed a critical value $C_c$ which depends on the source characteristics. Thus, for a given bandwidth C at a node in a heterogeneous environment, there may exist source classes, termed "statistically multiplexable" classes, for which $C_c < C$ and other classes, called "nonstatistically multiplexable," for which $C_c \geq C$.

The demand for CBR traffic is expected to constitute a significant part of customers overall demand in the initial deployment of ATM networks. As was pointed out in above, the fact that CBR traffic does not require buffers places disproportionate stress on network bandwidth. This is the source of one peculiarity associated with supporting CBR sources: the admission of CBR sources modifies the effective bandwidth of all VBR sources already in progress. Ironically, CBR sources are like NSMUX-VBR sources in that they both suppress statistical multiplexing among VBR sources. However, while NSMUX-VBR sources allow SMUX-VBR sources to share their bandwidth, CBR sources keep exclusive use of their bandwidth. (Thus, any pricing strategy should take these features into consideration.) How the presence of CBR traffic affects the resources available to VBR sources will be examined below. In particular, the admissible region for CBR and VBR sources will be derived.

Begin by first examining the effect of varying the channel capacity C on $e_0$ and $b_0$, the effective bandwidth and the effective buffer of regulated VBR sources for lossless multiplexing, while holding B and other parameters fixed. The important difference from above is that here B is fixed, while in the earlier treatment B is varied in proportion to C, ie. B/C is fixed.

Recall $e_0$ given in equation (21). The corresponding buffer allocation for lossless multiplexing $b_0$ is given as $$b_0 = \begin{cases} \dfrac{P}{C/B + (P-r)/B_T} & \text{for } C \geq \dfrac{B}{B_T} r \\ B_T & \text{otherwise.} \end{cases} \quad (70)$$

Note that increasing C allows the network to allocate more capacity to the user (increases $e_0$) and, in return, allocate less buffer space (decrease $b_0$). It is more appropriate here to consider $b_0$ as a measure of resource requirement rather than $e_0$ since B is fixed. It is interesting to note that $K_{max}$ is a piece-wise linear function of C, $$K_{max} = \dfrac{C}{E_0} = \dfrac{B}{b_0} = \begin{cases} \dfrac{B}{B_T} \dfrac{(P-r)}{P} + \dfrac{C}{P} & C \geq \dfrac{B}{B_T} r \\ \dfrac{1}{r} C & \text{otherwise} \end{cases} \quad (71)$$

First consider the multiplexing of sources of a single VBR class in the presence of CBR traffic. Let $C_0$ denote the CBR rate. The capacity available to the VBR sources is therefore $C-C_0$. If L is the loss rate then there exists a unique solution in K, the number of VBR sources, to $$F_K(s^*) = \log\left(\dfrac{1}{L}\right) \quad (72)$$

if $$\log\left(\dfrac{1}{L}\right) \leq \dfrac{C-C_0}{e_0} \log\left(\dfrac{1}{\omega}\right), \quad (73)$$

where $F_K(s^*)$, $e_0$ and w are respectively given in (38), (21) and (11) with C replaced by $(C-C_0)$. The solution to (72), denoted by $K_{max}$, is the maximum number of admissible VBR sources. Note that $$\dfrac{C-C_0}{e_0} \text{ and } \log\left(\dfrac{1}{\omega}\right)$$

are increasing with $(C-C_0)$ and, therefore, so is the right hand of (73).

Proposition 5 With B and C held fixed, $\tilde{C}_c$ is the smallest quantity such that the statistical multiplexing gain exceeds unity for all $(C-C_0)>\tilde{C}_c$, and is the unique solution, in $(C-C_0)$ to the equation $$\log\left(\dfrac{1}{L}\right) = \dfrac{C-C_0}{e_0} \log\left(\dfrac{1}{\omega}\right). \quad (74)$$

Hence, if $(C-C_0)\leq\tilde{C}_c$. the multiplexing gain is unity and $K_{max}$ is given by (71); if $(C-C_0)>\tilde{C}_s$, $K_{max}$ satisfies (72).

Now consider the admissible set of CBR and VBR sources, $$A_L(C_0,K): \left\{ (C_0,K): 0 \leq C_0 \leq C, F_K(s^*) \geq \log\left(\dfrac{1}{L}\right) \right\}.$$

It can show that the complement of the admissible set is convex. It can be shown that $$\dfrac{dK}{dC_0} < 1.$$

Consider now J VBR source classes and let $A_{L,C_0}(K)$ denote the admissible set of the VBR sources given that the CBR rate is $C_0$, $$A_{L,C_0}(K): \left\{ K: F_K(s^*) \geq \log\left(\dfrac{1}{L}\right) \right\},$$

where $F_K(s^*)$ is defined in (35) and (36) with C replaced by $(C-C_0)$. The admissible set of CBR and VBR sources, $$A_L(C_0,K): \left\{ (C_0,K): 0 \leq C_0 \leq C, F_K(s^*) \geq \log\left(\dfrac{1}{L}\right) \right\},$$

can be written as $$A_L(C_0,K) = \bigcup_{0 \leq C_0 \leq C} A_{L,C_0}(K).$$

The results for J=2 are summarized:
Case 1: $(C-C_0)<\min(\tilde{C}_{c,1}, \tilde{C}_{c,2})$, $A_{L,C_0}(k)=A_{0,C_0}(k)$, i.e., there is no statistical multiplexing gain, where $$A_{0,C_0}(K) = \left\{ K: \sum_j k_j e_{0,j} = C - C_0 \right\},$$

Case 2: $(C-C_0)>\max[\tilde{C}_{c,1}, \tilde{C}c,2]$, $A_{0,C_0}(K) \subset A_{L,C_0}(K)$,
Case 3: $\tilde{C}_{c,1}<C-C_0<\tilde{C}_{c,2}$. The boundary of the admissible set has a linear segment which coincides with the boundary of $A_{0,C_0}(K)$ and a convex segment. The breakpoint has coordinates $K_s$ which satisfy:

$$K_{s,1}e_{0,1}+K_{s,2}e_{0,2}=C-C_0 \quad K_{s,1}\log(1/w_1)+K_{s,2}\log(1/w_2)=\log(1/L).$$

V. Conclusion

The disclosure describes methods for admission control and routing by allocating network resources in network nodes. The techniques for bandwidth and buffer allocation described so far have been for a simple form of nodal buffer management. These techniques may be extended to handle more sophisticated buffer management schemes which exploit the priority levels of cells, for instance, by restricting access to the buffer by cells of low priority when the buffer content is above a certain threshold. In such schemes the objective of bandwidth and buffer allocation is to guarantee that losses sustained by the high priority cells do not exceed specified values; no guarantees are made for the performance of low priority cells. The techniques disclosed extend naturally to cover such refined forms of buffer management. Specifically, these calculations use for the buffer size B only the buffer space which is exclusively reserved for use by the high priority cells; the channel bandwidth C remains unchanged. Hence, with just this modification to B these techniques for the basic nodal buffer management scheme extend to the more sophisticated schemes.

The methods disclosed herein have been described without reference to specific hardware and software. Instead, the methods have been described in such as manner that those skilled in the art can readily adapt such hardware and software as may be available or preferable for a particular application.

We claim:

1. A method comprising the steps of:

receiving a signal representing a request for a virtual circuit for conveying data from a communication device, the requested virtual circuit to be routed through a node connected to a link, said node comprising a buffer of size B and said link being characterized by a capacity C, wherein said data arrives at said node at a rate characterized by a set of parameters, said set of parameters including a long term average rate r, a maximum burst size $B_T$ and a peak rate P;

determining effective bandwidth and buffer space requirements $e_0$ and $b_0$ from said set of parameters, wherein a ratio of said effective buffer space requirement $b_0$ to said buffer size B is substantially equal to a ratio of said effective bandwidth requirement $e_0$ to said link bandwidth capacity C, said effective bandwidth requirement $e_0$ satisfying the expression:

$$e_0 = \frac{P}{1 + \frac{B/C}{B_T}(P-r)} \text{ if } r \leq \frac{B_T}{B/C}, \text{ or } e_0 = r \text{ if } \frac{B_T}{B/C} \leq r < P;$$

admitting said virtual circuit request if said determined bandwidth and buffer space requirements $e_0$ and $b_0$ are less than available buffer memory space in said buffer and available link bandwidth capacity in said link.

2. The method of claim 1 wherein a set of i admitted virtual circuits, having respective bandwidth requirements $e_i$ are already routed through said node and wherein the step of admitting comprises the step of:

routing an i+1$^{th}$ requested virtual circuit through said node with respective bandwidth requirements $e_{i+1}$ if $$\sum_{j=1}^{i+1} e_j \leq C.$$

3. The method of claim 1 wherein said set of parameters characterize a function for controlling said rate of data from said communication device.

4. The method of claim 3 wherein said function is performed by an access regulator.

5. The method of claim 4 wherein said access regulator is a leaky bucket regulator.

6. The method of claim 1 further comprising the step of allocating said effective bandwidth requirement $e_0$ in said link for said admitted virtual circuit.

7. The method of claim 1 further comprising the step of allocating said effective buffer space requirement $b_0$ in said buffer for said admitted virtual circuit.

8. The method of claim 1 wherein a set of i admitted virtual circuits, having respective buffer requirements $b_i$ are already routed through said node and wherein the step of admitting comprises the step of:

routing an i+1$^{th}$ requested virtual circuit through said node with respective buffer size requirement $b_{i+1}$ if $$\sum_{j=1}^{i+1} b_j \leq B.$$

9. A method comprising the steps of:

receiving a signal representing a request for admission of a virtual circuit in a network for conveying data from a first communication device to a second communication device, the requested virtual circuit to be routed through an access regulator and at least one node connected to a corresponding link of said network, wherein data transmission characteristics of said access regulator are represented by a set of parameters, and wherein said node includes a buffer of size B, and said link is characterized by a bandwidth capacity C;

determining effective bandwidth and buffer space requirements $e_0$ and $b_0$ from said set of parameters, wherein a ratio of said effective buffer space requirement $b_0$ to said buffer size B is substantially equal to a ratio of said effective bandwidth requirement $e_0$ to said link bandwidth capacity C: and admitting said virtual circuit request if said determined bandwidth and buffer space requirements $e_0$ and $b_0$ are less than available buffer memory space in said buffer and available link bandwidth capacity in said link.

10. The method of claim 9 wherein said set of parameters representing said transmission characteristics of said access regulator comprise a long term average rate r, a maximum burst size $B_T$, and a peak rate P and wherein said effective bandwidth requirement $e_0$ satisfies the expression:

$$e_0 = \begin{cases} \dfrac{P}{1 + \dfrac{B/C}{B_T}(P-r)} & \text{if } r \leq \dfrac{B_T}{B/C} \\ r & \text{if } \dfrac{B_T}{B/C} \leq r < P \end{cases}$$

11. The method of claim 9 wherein said access regulator is a leaky bucket regulator.

12. The method of claim 9 further comprising the step of allocating said effective bandwidth requirement $e_0$ in said link for said admitted virtual circuit.

13. The method of claim 12 wherein a set of i admitted virtual circuits, having respective bandwidth requirements $e_i$ are already routed through said node and wherein the step of admitting comprises the step of:

routing an i+1$^{th}$ requested virtual circuit through said node with respective associated bandwidth requirement $e_{i+1}$ if $$\sum_{j=1}^{i+1} e_j \leq C.$$

14. The method of claim 9 further comprising the step of allocating said effective buffer space requirement $b_0$ in said node for said admitted virtual circuit.

15. The method of claim 14 wherein a set of i admitted virtual circuits, having respective buffer space requirements $b_I$ are already routed through said node and wherein the step of admitting comprises the step of:

routing an i+1$^{th}$ requested virtual circuit through said node with respective associated buffer space requirement $b_{i+1}$ if $$\sum_{j=1}^{i+1} b_j \leq B.$$

16. A method comprising the steps of:
   a) receiving a signal representing a request for a admission of a virtual circuit for conveying data from a first communication device to a second communication device, the requested virtual circuit to be routed through an access regulator having data transmission characteristics represented by a set of parameters,
   b) selecting a set of N potential paths for said requested virtual circuit, the $n^{th}$ potential path comprising a set of $J_n$ nodes wherein the $j^{th}$ node in said set of $J_n$ nodes comprises a buffer of size $B_{jn}$ and wherein the $j^{th}$ node is connected to a link of capacity $C_{jn}$, and
   c) determining effective bandwidth and buffer space requirements $e_{0in}$ and $b_{0in}$ from said set of parameters for nodes and links forming at least one of said potential paths, wherein a ratio of said effective buffer space requirement $b_{0in}$ to said buffer size $B_{in}$ is substantially equal to a ratio of said effective bandwidth requirement $e_{0in}$ to said link bandwidth capacity $C_{in}$; and
   d) admitting said virtual circuit request to a particular one of said potential paths if said determined bandwidth and buffer space requirements $e_{0in}$ and $b_{0in}$ are less than available buffer memory space in said node buffers and available bandwidth capacity in links forming said particular path.

17. The method of claim 16 further comprising the step of allocating said effective bandwidth requirement $e_{0in}$ in said respective links forming said particular path for said admitted virtual circuit.

18. The method of claim 17 wherein said $j^{th}$ node in said particular path for said admitted virtual circuit has a set of $I_{jn}$ virtual circuits already routed through said $j^{th}$ node and wherein the $i^{th}$ admitted virtual circuit in said set of $I_{jn}$ virtual circuits through said $j^{th}$ node has been allocated bandwidth $e_{i,jn}$ and wherein the step of admitting comprises the step of:
   choosing said particular $n^{th}$ path as a path in a set of viable paths if for the $n^{th}$ path:

$$\forall_j \sum_{m=0}^{I_{j_n}} e_{m,j_n} < C_{jn}$$

is satisfied.

19. The method of claim 16 further comprising the step of allocating said effective buffer space requirement $b_{0in}$ in said respective buffers $B_{jn}$ of said nodes in said particular path for said admitted virtual circuit.

20. The method of claim 19 wherein said $j^{th}$ node in said particular path for said admitted virtual circuit has a set of $I_{jn}$ admitted virtual circuits already routed through said $j^{th}$ node and wherein the $i^{th}$ admitted virtualcircuit in said set of $I_{jn}$ virtual circuits through said $j^{th}$ node has been allocated buffer space requirement $b_{i,jn}$ and wherein the step of admitting comprises the step of:
   choosing said particular $n^{th}$ potential path as a path in said set of viable paths if for the $n^{th}$ potential path:

$$\forall_j \sum_{m=0}^{I_{j_n}} b_{m,j_n} < B_{jn}$$

is satisfied.

21. In a network comprising a node, said node connected to a link of capacity C and to a set of access regulators, wherein each access regulator is characterized by a set of parameters, wherein each access regulator has an associated virtual circuit routed through it and through said node and wherein identical sets of parameters characterize a class associated with the identical sets of parameters, a method comprising the steps of:
   receiving a signal representing a request for a virtual circuit, the virtual circuit to be routed through a particular access regulator characterized by a particular set of parameters and through said node, the set of parameters characterizing a particular class,
   determining an effective bandwidth for each class through said node,
   at said node determining a maximum number of requests for virtual circuits of said particular class that can be routed through said node for a given probability of loss,
   allocating to said request a bandwidth requirement as a function of said capacity C and said maximum number, and
   admitting said request if the sum of the product of the effective bandwidths for each class and the number of virtual circuits associated with each class is less than said capacity C minus said allocated bandwidth requirement.

22. A method comprising the steps of:
   receiving a signal representing a request for admission of a virtual circuit for conveying data from a first communication device to a second communication device, the requested virtual circuit to be routed through an access regulator and at least one node connected to a corresponding link, wherein data transmission characteristics of said access regulator are represented by a set of parameters, and wherein said node includes a buffer of size B, and said link is characterized by a bandwidth capacity C;
   determining effective bandwidth and buffer space requirements $e_0$ and $b_0$ from said set of parameters, wherein a ratio of said effective buffer space requirement $b_0$ to said buffer size B is substantially equal to a ratio of said effective bandwidth requirement $e_0$ to said link bandwidth capacity C;
   determining a required bandwidth and buffer space allotments e and b based on said effective buffer space and bandwidth requirement $b_0$ and $e_0$ an acceptable data loss probability L; and
   admitting said virtual circuit request if said determined required bandwidth and buffer space allotments e and b are less than or equal to available buffer memory space in said buffer and available link bandwidth capacity in said link.

23. The method of claim 22 wherein said step of determining said required bandwidth allotment e determines a plurality of allotments $e_j$ based on a corresponding plurality of effective bandwidth $e_{0,j}$ for respective classes $j=1, \ldots, J$ of LBR parameters.

24. The method of claim 23 wherein said at least one required bandwidth allotment $e_j$ determination for a respective class j of LBR parameters satisfies the expression $e_j = C/K_{maxj}$ and wherein maximum number of connections $K_{maxj}$ for the class j further satisfies the requirement of the probability of $K_{maxj} \cdot e_0 > C$ is less than or equal to said acceptable loss probability L.

25. The method of claim 24 wherein the value $K_{maxj}$ satisfies the expression $$\log\left(\frac{1}{L}\right) = K\left\{a \cdot \log\left(\frac{a}{w}\right) + (1-a)\log\left(\frac{1-a}{1-w}\right)\right\},$$

wherein $a=(C/e_0)/K$ and $w=r/e_0$ and wherein r is a long term average rate transmitted by said access regulator.

26. The method of claim 24 wherein said step of determining said bandwidth allotments $e_j$ is performed for a plurality of LBR parameter classes j-1, . . . , J and wherein the respective values $K_{maxj}$ for the classes j also satisfies the expression:

$$\sum_{j=1}^{J} K_j e_j < C.$$

27. The method of claim 26 wherein at least one class j is non-statistically multiplexible and wherein said corresponding bandwidth allotment $e_j$ for that class is set to said corresponding effective bandwidth allotment $e_{0j}$.

28. The method of claim 27 wherein a class is non-statistically multiplexible if the link bandwidth capacity C is than a critical capacity $C_c$ satisfying the expression:

$$C_C = \frac{e_{0j} \cdot \log\left(\frac{1}{L}\right)}{\log\left(\frac{L}{wj}\right)},$$

wherein $w_j = r/e_{0j}$ and wherein r is a long term average rate transmitted by said access regulator having LBR parameters of class j.

29. The method of claim 23 wherein said plurality of LBR parameter classes include at least one statistically multiplexible class and at least on non-statistically multiplexible class, the method further comprising:

determining a maximum permissible number of connections $K_{maxj}$ for said classes j=1, . . . ,J;

determining a breakpoint $K_{s,j}$ for j=1, . . . , J that satisfy the expressions:

$$\sum_{j=1}^{J} K_{sj} e_{0j} = C$$

and $$\sum_{j=1}^{J} K_{sj} \log\left(\frac{1}{wj}\right) = \log\left(\frac{1}{L}\right),$$

wherein $w_j = r/e_{0j}$ and wherein r is a long term average rate transmitted by said access regulator having LBR parameters of class j; and determining the bandwidth allotments $e_j$ for said classes j=1, . . . ,J based on said determined maximum permissible number of connections $K_{maxj}$ and breakpoint $K_{sj}$.

30. The method of claim 22 wherein said set of parameters representing said transmission characteristics of said access regulator comprise a long term average rate r, a maximum burst size $B_T$, and a peak rate P and wherein said effective bandwidth requirement $e_0$ satisfies the expression:

$$e_0 = \begin{cases} \dfrac{P}{1 + \dfrac{B/C}{B_T}(P-r)} & \text{if } r \leq \dfrac{B_T}{B/C} \\ r & \text{if } \dfrac{B_T}{B/C} \leq r < P. \end{cases}$$

* * * * *